(12) United States Patent
Wang et al.

(10) Patent No.: US 12,439,913 B2
(45) Date of Patent: Oct. 14, 2025

(54) ALCOHOL ETHER COMPOUND AND USE THEREOF IN WATER-BASED NANOPESTICIDE PREPARATION

(71) Applicant: INSTITUTE OF ENVIRONMENT AND SUSTAINABLE DEVELOPMENT IN AGRICULTURE, CAAS, Beijing (CN)

(72) Inventors: Yan Wang, Beijing (CN); Changcheng An, Beijing (CN)

(73) Assignee: INSTITUTE OF ENVIRONMENT AND SUSTAINABLE DEVELOPMENT IN AGRICULTURE, CAAS, Beijing (CN)

( * ) Notice: Subject to any disclaimer, the term of this patent is extended or adjusted under 35 U.S.C. 154(b) by 0 days.

(21) Appl. No.: 18/996,075

(22) PCT Filed: Mar. 8, 2024

(86) PCT No.: PCT/CN2024/080786
§ 371 (c)(1),
(2) Date: Jan. 17, 2025

(87) PCT Pub. No.: WO2024/188178
PCT Pub. Date: Sep. 19, 2024

(65) Prior Publication Data
US 2025/0255296 A1    Aug. 14, 2025

(30) Foreign Application Priority Data
Mar. 10, 2023 (CN) .......................... 202310255128.1

(51) Int. Cl.
*A01N 25/30* (2006.01)
*A01N 43/90* (2006.01)
*A01P 7/00* (2006.01)
*C07C 43/295* (2006.01)
*C07C 45/64* (2006.01)

(52) U.S. Cl.
CPC ............. *A01N 25/30* (2013.01); *A01N 43/90* (2013.01); *A01P 7/00* (2021.08); *C07C 43/295* (2013.01); *C07C 45/64* (2013.01)

(58) Field of Classification Search
CPC ..................................................... A01N 25/30
See application file for complete search history.

(56) References Cited

FOREIGN PATENT DOCUMENTS

| | | |
|---|---|---|
| CN | 103858861 A | 6/2014 |
| CN | 103858936 A | 6/2014 |
| CN | 105685025 A | 6/2016 |
| CN | 111134120 A | 5/2020 |
| CN | 116253626 A | 6/2023 |

OTHER PUBLICATIONS

A: "Fabrication, Characterization and Biological Activity of Emamectin Benzoate Nanoformulation", Master's Theses of Guangxi University, May 15, 2023.
An et al: "Design and Synthesis of a Water-Based Nanodelivery Pesticide System for Improved Efficacy and Safety", ACS NANO, vol. 18, No. 1, p. 662-679, 2024.

*Primary Examiner* — Yong S. Chong
(74) *Attorney, Agent, or Firm* — WCF IP

(57) ABSTRACT

An alcohol ether compound and use thereof in a water-based nanopesticide preparation are provided. The alcohol ether compound has a structure shown in Formula 1. The alcohol ether compound is used as a specific surfactant of emamectin benzoate, and a stable and transparent water-based nanopreparation for the emamectin benzoate could be obtained in water at room temperature.

5 Claims, 4 Drawing Sheets

ALCOHOL ETHER COMPOUND AND USE THEREOF IN WATER-BASED NANOPESTICIDE PREPARATION

CROSS REFERENCE TO RELATED APPLICATION

This patent application is a national stage application of International Patent Application No. PCT/CN2024/080786, filed on Mar. 8, 2024, which claims priority to Chinese Patent Application No. 2023102551281 filed with the China National Intellectual Property Administration (CNIPA) on Mar. 10, 2023. The disclosures of the two applications each are incorporated herein by reference in its entirety.

TECHNICAL FIELD

The present disclosure belongs to the technical field of organic synthesis and fine chemical industry, and in particular to an alcohol ether compound and use thereof in a water-based nanopesticide preparation.

BACKGROUND

Using pesticides plays a crucial role in ensuring the grain yield and the quality of agricultural products. Pesticide preparations are important carriers for delivering active ingredients of pesticides to their targets. The quality of pesticide preparations is a critical factor in determining the value and effect of pesticide products. The pesticide preparations, as important carriers for delivering the active ingredients of pesticides to their targets, also determine the utilization rate of pesticides and the environmental fate and biological safety of pesticides in non-target areas.

Emamectin benzoate is widely used in agriculture due to its high efficiency and low toxicity. This pesticide could effectively control plant diseases with high safety and low impact on humans and the environment. Its mechanism of action involves enhancing the neuroplasm of pests, such as glutamic acid and γ-aminobutyric acid (GABA), leading to the entry of a large number of chloride ions into nerve cells, thereby resulting in cell dysfunction, disrupted nerve conduction. The larvae stop feeding immediately after exposure, undergo irreversible paralysis and eventually die. The control effect reaches the highest mortality rate within 3-4 days. It exhibits excellent insecticidal activity against mites, *Lepidoptera*, and *Coleoptera* pests, and is widely used as a biological pesticide for controlling pests such as *Arta statalis*, *Spodoptera litura*, *Helicoverpa armigera*, *Manduca sexta*, *Plutella xylostella*, *Spodoptera exigua*, *Spodoptera frugiperda*, *Pectinophora gossypiella*, and *Trichoplusia ni* in various crops, including vegetables, fruits, food crops, and forests.

Emulsifiable concentrates, micro-emulsions, and wettable powders are common preparations of emamectin benzoate. Due to the coarse size of the drug particles of the traditional preparations, the traditional preparations fail to adhere to the target as much as possible, resulting in the waste of most active ingredients. Studies indicate that the active ingredients in traditional preparations cannot effectively act on the target through leaching, drifting, and other ways, leading to an effective utilization rate of pesticides of less than 0.1%. In addition, emamectin benzoate is easy to be photolyzed, and the traditional preparations keep the active ingredients in an open environment, making it challenging to ensure the utilization rate of emamectin benzoate. Secondly, the product structure of commonly used emamectin benzoate preparations contains a large number of organic solvents and agricultural additives, which pose a threat to the environment and food safety, and are susceptible to the development of pest resistance.

A large number of studies have reported methods for optimizing the photolysis rate of emamectin benzoate and improving the control effects. These methods include microencapsulation of emamectin benzoate, development of anti-photolysis nanodelivery preparations of emamectin benzoate, adsorption of emamectin benzoate in protective materials such as hollow mesoporous materials, and modification and optimization of the structure of emamectin benzoate itself. These methods improve the disadvantages of the application of emamectin benzoate to a certain extent, but most of them are complicated and expensive and inevitably use organic solvents, which limit their wide application.

The water-based preparations involve the water-based conversion of a water-insoluble original drugs. After diluting with water, active ingredients are dispersed or dissolved in water to form a milky, suspended, or transparent state and might be sprayed for use. Water-based preparations have the advantages of minimal environmental pollution, low toxicity to humans and animals, and resource saving.

However, as a more environmentally friendly way of nanodelivery of lipid-soluble pesticides, water-based preparations are difficult to prepare without using any harmful organic solvents.

SUMMARY

An object of the present disclosure is to provide an alcohol ether compound and use thereof in a water-based nanopesticide preparation. In the present disclosure, the alcohol ether compound is used as a specific surfactant of emamectin benzoate, and could react with the emamectin benzoate in water at room temperature to obtain a stable water-based nano-preparation of the emamectin benzoate.

To achieve the above object, the present disclosure provides the following technical solutions:

The present disclosure provides an alcohol ether compound having a structure shown in Formula 1:

Formula 1

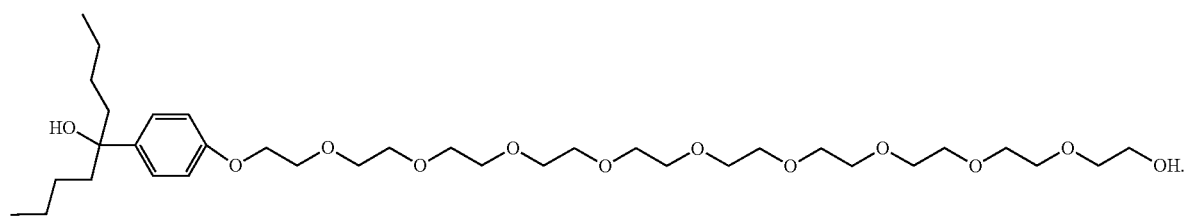

The present disclosure further provides a method for preparing the alcohol ether compound, including the following steps:

mixing 4'-hydroxyvalerophenone, ethylene oxide (EO), and a strong alkali catalyst in a protective gas atmosphere, subjecting a resulting mixture to ring-opening condensation to obtain 4-valerylphenol polyoxyethylene ether having a structure shown in Formula 2;

Formula 2

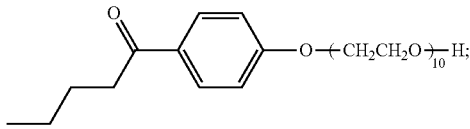

and mixing the 4-valerylphenol polyoxyethylene ether having the structure shown in Formula 2, tetrahydrofuran (THF), and a Grignard reagent in a protective gas atmosphere, subjecting an obtained mixture to affinity addition to obtain an addition reaction solution, and adjusting the pH value of the addition reaction solution to 5 to 6 with a dilute acid solution to obtain the alcohol ether compound having the structure shown in Formula 1.

In some embodiments, a mass ratio of the 4'-hydroxyvalerophenone to the EO is 1:3;

the ring-opening condensation is conducted at a temperature of 80° C. to 120° C. under a pressure of 0.01 MPa to 0.04 MPa.

In some embodiments, the Grignard reagent is n-butylmagnesium chloride;

a ratio of a mass of the 4-valerylphenol polyoxyethylene ether to a volume of the THF is 31 g: 40 mL.

In some embodiments, the method further includes the following steps after the affinity addition is completed: mixing the addition reaction solution having the pH value of 5 to 6 with ethyl acetate, subjecting a resulting mixed solution to extraction to obtain an extracted organic phase; and subjecting the extracted organic phase to dehydration, and then removing an organic solvent to obtain the alcohol ether compound having the structure shown in Formula 1.

The present disclosure further provides use of the alcohol ether compound having the structure shown in Formula 1 or the alcohol ether compound having the structure shown in Formula 1 prepared by the method in production of a water-based nano-preparation for emamectin benzoate.

The present disclosure further provides a water-based nano-preparation for emamectin benzoate, including emamectin benzoate, a surfactant, and water, where the surfactant is the alcohol ether compound having the structure shown in Formula 1 or the alcohol ether compound having the structure shown in Formula 1 prepared by the preparation method.

In some embodiments, a mass percentage of the emamectin benzoate is in a range of 0.1% to 5%.

In some embodiments, a mass percentage of the surfactant is in a range of 4% to 5%.

In some embodiments, the water-based nano-preparation for emamectin benzoate has an average particle size of 40 nm.

The present disclosure provides an alcohol ether compound having the structure shown in Formula 1. The alcohol ether compound having the structure shown in Formula 1 has long side chains in its molecular structure, making it easy to achieve self-assembly. Moreover, branching of a non-polar group makes hydrophilicity and lipophilicity of the alcohol ether compound having the structure shown in Formula 1 close to equilibrium, such that a microemulsion system could be spontaneously formed in water. Furthermore, an appropriate molecular chain length makes it conducive to forming a stable small-sized assembly structure when the interface is bent. In addition, the alcohol ether compound has a low molecular weight, its hydrophilic group is in a middle position of the molecular chain, and a desirable wetting effect. While the hydrophilic group has more oxygen atoms, indicating stronger hydrophilicity. The alcohol ether compound is used as a specific surfactant of emamectin benzoate, and a stable and transparent water-based nano-preparation for the emamectin benzoate could be obtained in water at room temperature. This process does not require any organic solvent, and exhibits low environmental pollution and toxicity to humans and animals as well as resource conservation.

The present disclosure further provides a water-based nano-preparation for emamectin benzoate, including emamectin benzoate, a surfactant, and water, where the surfactant is the compound having the structure shown in Formula 1 or the compound having the structure shown in Formula 1 prepared by the method. The water-based nano-preparation for emamectin benzoate has a stable structure and could be sprayed after being diluted with water, showing less environmental pollution, low toxicity to humans and animals, and resource conservation.

Further, in the present disclosure, a mass percentage of the surfactant is in a range of 4% to 5%. The water-based nano-preparation for emamectin benzoate according to the present disclosure includes low content and small dosage surfactant, reducing the cost.

DETAILED DESCRIPTION OF THE EMBODIMENTS

Figure 1:
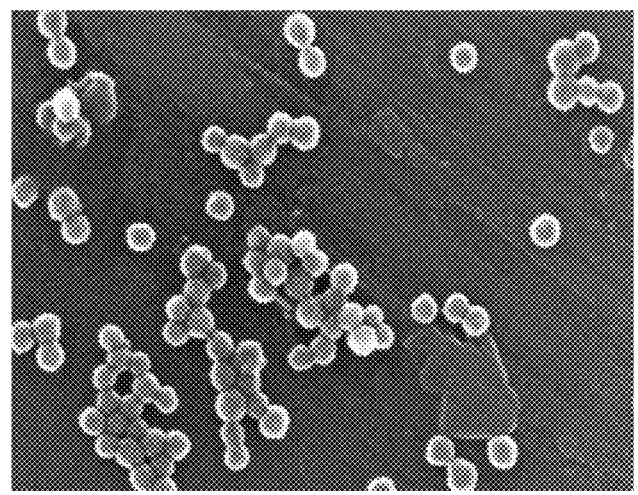
FIG. 1 shows a scanning electron microscopy (SEM) image of the water-based nano-preparation for emamectin benzoate prepared in Example 2 of the present disclosure.

The present disclosure provides an alcohol ether compound having a structure shown in Formula 1:

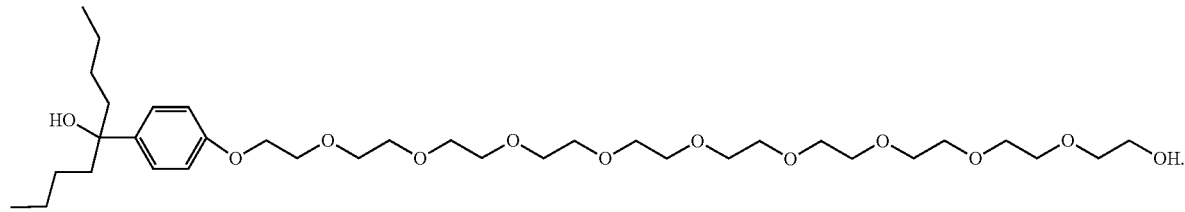

Formula 1

In the present disclosure, the alcohol ether compound having the structure shown in Formula 1 is used as a specific surfactant of emamectin benzoate, and a stable and transparent water-based nano-preparation for the emamectin benzoate could be obtained in water at room temperature. This process does not require any organic solvent, and exhibits low environmental pollution and toxicity to humans and animals as well as resource conservation.

The present disclosure further provides a method for preparing the alcohol ether compound, including the following steps:

mixing 4'-hydroxyvalerophenone, ethylene oxide (EO), and a strong alkali catalyst in a protective gas atmosphere, subjecting a resulting mixture to a ring-opening condensation to obtain 4-valerylphenol polyoxyethylene ether having a structure shown in Formula 2;

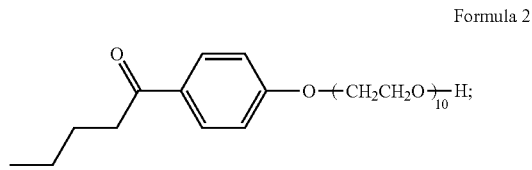

Formula 2 and mixing the 4-valerylphenol polyoxyethylene ether having the structure shown in Formula 2, tetrahydrofuran (THF), and a Grignard reagent in a protective gas atmosphere, subjecting an obtained mixture to affinity addition to obtain an addition reaction solution, and adjusting the pH value of the addition reaction solution to 5 to 6 with a dilute acid solution to obtain the alcohol ether compound having the structure shown in Formula 1.

In the present disclosure, unless otherwise specified, all raw materials are commercially available products well known to those skilled in the art.

In the present disclosure, 4'-hydroxyvalerophenone, EO, and a strong alkali catalyst are mixed in a protective gas atmosphere (hereinafter referred to as a first mixing), and subjected to ring-opening condensation to obtain 4-valerylphenol polyoxyethylene ether having the structure shown in Formula 2.

In some embodiments of the present disclosure, the strong alkali catalyst is an alkali metal hydroxide, and in some embodiments, the alkali metal hydroxide is sodium hydroxide.

In some embodiments of the present disclosure, the 4'-hydroxyvalerophenone is subjected to drying before the first mixing. In some embodiments, the drying is conducted at a temperature of 100° C. to 110° C. In some embodiments, the drying is conducted for 0.5 h to 1 h. In some embodiments, the drying is vacuum drying. In some embodiments, the drying is conducted in a protective gas atmosphere, and the protective gas atmosphere is a nitrogen atmosphere. In some embodiments, the drying includes the following steps: heating the 4'-hydroxyvalerophenone to the temperature for drying in the protective gas atmosphere, holding at the temperature for drying, and then cooling to room temperature.

In some embodiments of the present disclosure, the first mixing includes the following steps: mixing the 4'-hydroxyvalerophenone and the strong alkali catalyst in the protective gas atmosphere, heating to a temperature of 80° C. to 120° C., and then adding the EO.

In some embodiments of the present disclosure, a mass ratio of the 4'-hydroxyvalerophenone to the EO is 1:3.

In some embodiments of the present disclosure, a mass of the strong alkali catalyst accounts for 2% of a total mass of the 4'-hydroxyvalerophenone and the EO.

In some embodiments of the present disclosure, the ring-opening condensation is conducted at a temperature of 80° C. to 120° C., preferably 85° C. to 115° C. In some embodiments, the ring-opening condensation is conducted under a pressure of 0.01 MPa to 0.04 MPa, preferably 0.02 MPa to 0.03 MPa in a protective gas atmosphere. In some embodiments, the protective gas atmosphere is a nitrogen atmosphere. There is no special requirement for heat preservation time and pressure preservation time of the ring-opening condensation, as long as the raw materials are ensured to react completely. In a specific embodiment, the ring-opening condensation is conducted for 10 h.

In some embodiments of the present disclosure, a crude product of the 4-valerylphenol polyoxyethylene ether having the structure shown in Formula 2 is obtained through the ring-opening condensation, and after the ring-opening condensation, the method further includes the following steps: subjecting the crude product of the 4-valerylphenol polyoxyethylene ether to purification to obtain a pure product of the 4-valerylphenol polyoxyethylene ether. In some embodiments of the present disclosure, the purification includes the following steps: mixing the crude product of the 4-valerylphenol polyoxyethylene ether with water under heating to obtain a crude product feed liquid; mixing the crude product feed liquid with an activated carbon to obtain a mixed feed liquid; subjecting the mixed feed liquid to dehydration to obtain a dehydrated feed liquid; and subjecting the dehydrated feed liquid to solid-liquid separation to obtain the pure product of the 4-valerylphenol polyoxyethylene ether. In some embodiments, the water is deionized water. In some embodiments, a mass ratio of the crude product of the 4-valerylphenol polyoxyethylene ether and the water is 2:0.5. In some embodiments, the mixing under heating is conducted at a temperature of 60° C. to 70° C. In some embodiments, the mixing under heating is conducted for 0.5 h. In the present disclosure, a mass of the activated carbon accounts for 5% of a mass of the crude product feed liquid. In some embodiments, the crude product feed liquid and the activated carbon are mixed under stirring for 0.5 h. In some embodiments of the present disclosure, the dehydration is vacuum dehydration. In some embodiments, the dehydration is conducted for 1.5 h to 6 h. In some embodiments, the solid-liquid separation is conducted by filtration. In some embodiments, the solid-liquid separation is conducted at 60° C.

In the present disclosure, the 4-valerylphenol polyoxyethylene ether having the structure shown in Formula 2, THF, and a Grignard reagent are mixed in a protective gas atmosphere (hereinafter referred to as a second mixing), and a resulting mixture are subjected to affinity addition to obtain an addition reaction solution, and adjusting the pH value of the addition reaction solution to 5 to 6 with a dilute acid solution to obtain the alcohol ether compound having the structure shown in Formula 1.

In some embodiments of the present disclosure, the Grignard reagent is n-butylmagnesium chloride. In some embodiments of the present disclosure, a solution of the n-butylmagnesium chloride in THF is used in the second mixing. In some embodiments, the solution of the n-butylmagnesium chloride in THF has a molar concentration of 2 mol/L.

In some embodiments of the present disclosure, a ratio of a mass of the 4-valerylphenol polyoxyethylene ether to a volume of the THF is 31 g:40 mL.

In some embodiments of the present disclosure, a volume ratio of the THF to the solution of the n-butylmagnesium chloride in THF is 8:7.

In some embodiments of the present disclosure, the second mixing includes the following steps: mixing the 4-valerylphenol polyoxyethylene ether and the THF and cooling to a temperature of 5° C. to 10° C. to obtain a mixture; and dropwise adding the solution of the n-butyl magnesium chloride in THF into the mixture in a protective gas atmosphere. In some embodiments, the protective gas atmosphere is a nitrogen atmosphere. In some embodiments, the dropwise adding is conducted at a speed of 175 mL/h.

In some embodiments of the present disclosure, the affinity addition is conducted at room temperature. In some embodiments, the affinity addition is conducted for 24 h.

In the present disclosure, the pH value of the addition reaction solution after affinity addition is adjusted to 5 to 6 with a dilute acid solution to obtain the alcohol ether compound having the structure shown in Formula 1.

In some embodiments of the present disclosure, the dilute acid solution is a hydrochloric acid solution. In some embodiments of the present disclosure, a mass ratio of the hydrochloric acid solution is 10%. In some embodiments of the present disclosure, when the dilute acid solution is added to adjust the pH value, the addition reaction solution is cooled in a water bath. In some embodiments of the present disclosure, the addition reaction solution with a pH value of 5 to 6 is subjected to a post-treatment to obtain the alcohol ether compound having the structure shown in Formula 1. In some embodiments of the present disclosure, the post-treatment includes the following steps: mixing the addition reaction solution with a pH value of 5 to 6 with ethyl acetate, subjecting a resulting mixture to extraction to obtain an extracted organic phase; and subjecting the extracted organic phase to dehydration, and then removing an organic solvent to obtain the alcohol ether compound having the structure shown in Formula 1. In some embodiments, the extraction is conducted 3 times. In the present disclosure, phases obtained from each extraction are combined to obtain the extracted organic phase. In some embodiments, the dehydration is conducted using saturated saline.

The present disclosure further provides use of the alcohol ether compound having the structure shown in Formula 1 or the alcohol ether compound having the structure shown in Formula 1 prepared by the method in production of a water-based nano-preparation for emamectin benzoate.

The present disclosure further provides a water-based nano-preparation for emamectin benzoate, including emamectin benzoate, a surfactant, and water, where the surfactant is the alcohol ether compound having the structure shown in Formula 1 or the alcohol ether compound having the structure shown in Formula 1 prepared by the method.

In some embodiments of the present disclosure, a mass ratio of the emamectin benzoate is in a range of 0.1% to 5%, preferably 4.4%.

In some embodiments of the present disclosure, a mass ratio of the surfactant is in a range of 4% to 5%, preferably 4.46%.

In some embodiments of the present disclosure, the water-based nano-preparation for emamectin benzoate has an average particle size of 40 nm.

In the present disclosure, the water-based nano-preparation for the emamectin benzoate is a clear and transparent preparation.

The present disclosure further provides a method for preparing the water-based nano-preparation for emamectin benzoate, including the following steps: mixing the emamectin benzoate, the surfactant, and the water under stirring to obtain the water-based nano-preparation for emamectin benzoate, where the surfactant is the alcohol ether compound having the structure shown in Formula 1 or the alcohol ether compound having the structure shown in Formula 1 prepared by the method. In the present disclosure, the mixing under stirring is conducted at room temperature. In some embodiments, the mixing under stirring is conducted at a speed of 600 r/min. for preferably 15 min.

In order to further illustrate the present disclosure, the technical solutions provided by the present disclosure are described in detail below in conjunction with accompanying drawings and examples, but these examples should not be understood as limiting the claimed scope of the present disclosure.

EXAMPLE 1

Figure 4:
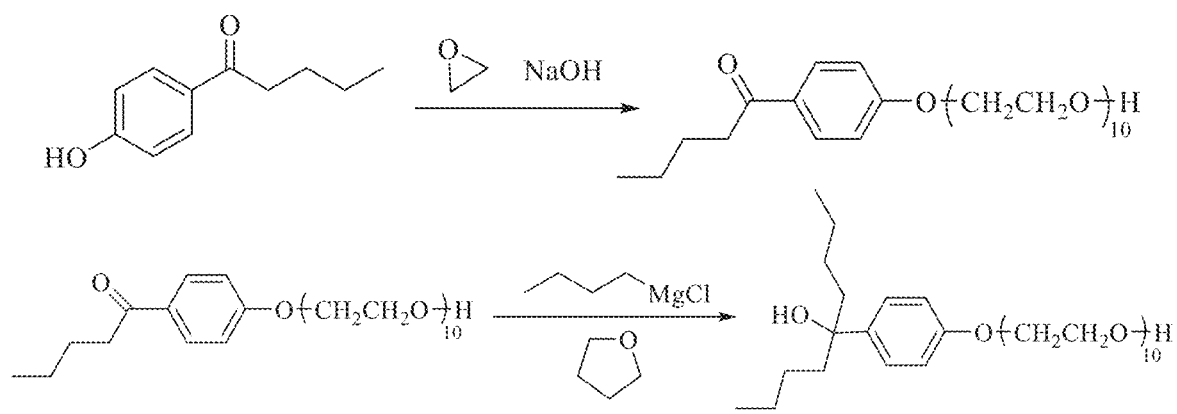
FIG. 4 shows a preparation flow chart of the compound having the structure shown in Formula 1 provided in Example 1 of the present disclosure.

Preparation was conducted according to the preparation flow chart of FIG. 4:

500 g of 4'-hydroxyvalerophenone was heated to 110° C. under nitrogen, vacuum-dehydrated for 1 h, cooled, and sodium hydroxide accounting for 2% of a total mass of the 4'-hydroxyvalerophenone and EO was added thereto. A resulting mixture was heated to 80° C. under nitrogen. 1.5 kg of EO was added thereto. A reaction was completed at 120° C. and 0.04 MPa, a resulting reaction product was cooled to obtain 2.0 kg of a crude product of 4-valerylphenol polyoxyethylene ether.

2.0 kg of the crude product of the 4-valerylphenol polyoxyethylene ether and 500 g of deionized water were mixed and heated to 70° C., and then stirred for 0.5 h, and 5% of activated carbon adsorbent (5% of a total mass of the crude product of 4-valerylphenol polyoxyethylene ether and the deionized water) was added thereto. A resulting mixture was stirred for another 0.5 h, and then slowly vacuumed and dehydrated for 6 h. A resulting system was cooled to 60° C., and filtered to obtain a pure product (1.7 kg) of the 4-valerylphenol polyoxyethylene ether having the structure shown in Formula 2.

The pure product (310 g) of the 4-valerylphenol polyoxyethylene ether having the structure shown in Formula 2 and THF (400 mL) were placed in a four-necked flask. A resulting solution was cooled to 10° C. to obtain a cooled solution, and a solution of n-butylmagnesium chloride in THF (350 mL, with a concentration of 2 M) was added dropwise to the cooled solution within 2 h under nitrogen protection to obtain a reaction solution. The reaction solution was heated to room temperature (25° C.) and reacted overnight. While cooling in a water bath, 10% dilute hydrochloric acid was added dropwise into the reaction solution to adjust a pH value to 5 to 6. After sufficient stirring, a product was extracted with ethyl acetate (EA) (300 mL×3), organic solutions obtained after extraction three time was combined, and then desalted and dehydrated with saturated brine, was then subjected to desolventization to obtain a brown viscous liquid, which was the alcohol ether compound (300 g) having the structure shown in Formula 1.

Figure 5:
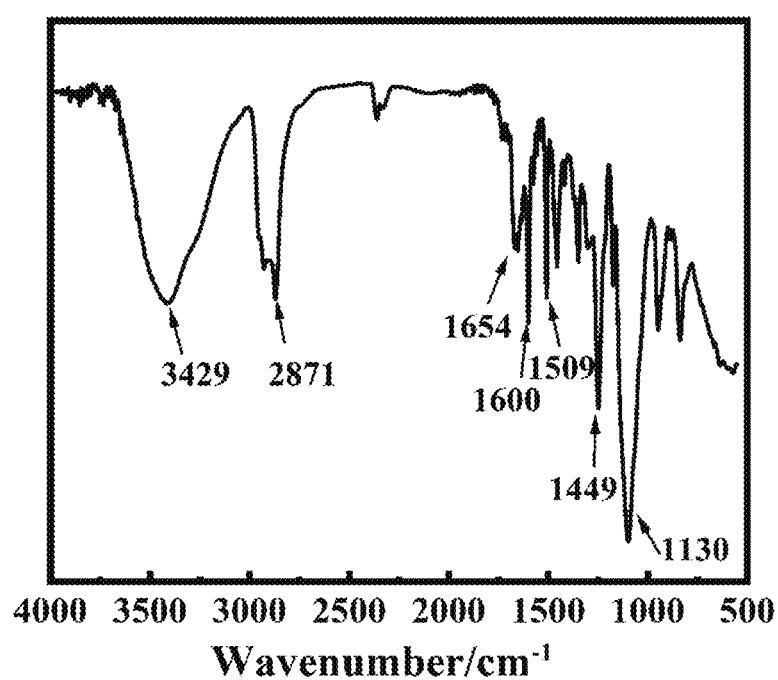
FIG. 5 shows an infrared absorption spectrum of the compound having the structure shown in Formula 1 provided in Example 1 of the present disclosure.

FIG. 5 shows an infrared absorption spectrum of the alcohol ether compound having the structure shown in Formula 1. As shown in FIG. 5, the strong peak at 3,429 $cm^{-1}$ attributes to the infrared absorption peak of the hydroxyl group in the monomer structure; 2,871 $cm^{-1}$ attributes to the stretching vibration peak of methyl and methylene groups in the monomer structure; 1,654 $cm^{-1}$, 1,600 $cm^{-1}$, 1,509 $cm^{-1}$, and 1,449 $cm^{-1}$ attribute to the absorption peaks of a benzene ring (C=C bond) in the alcohol ether compound having the structure shown in Formula 1; where 1,600 $cm^{-1}$ and 1,509 $cm^{-1}$ attributes to the characteristic absorption bands of the benzene ring, and 1,130 $cm^{-1}$ attributes to the stretching vibration absorption peak of an ether bond (C—O—C) in the long-chain structure of the monomer. Based on the characterization of infrared characteristic peaks, a structure of the alcohol ether compound having the structure shown in Formula 1 was determined.

Figure 6:
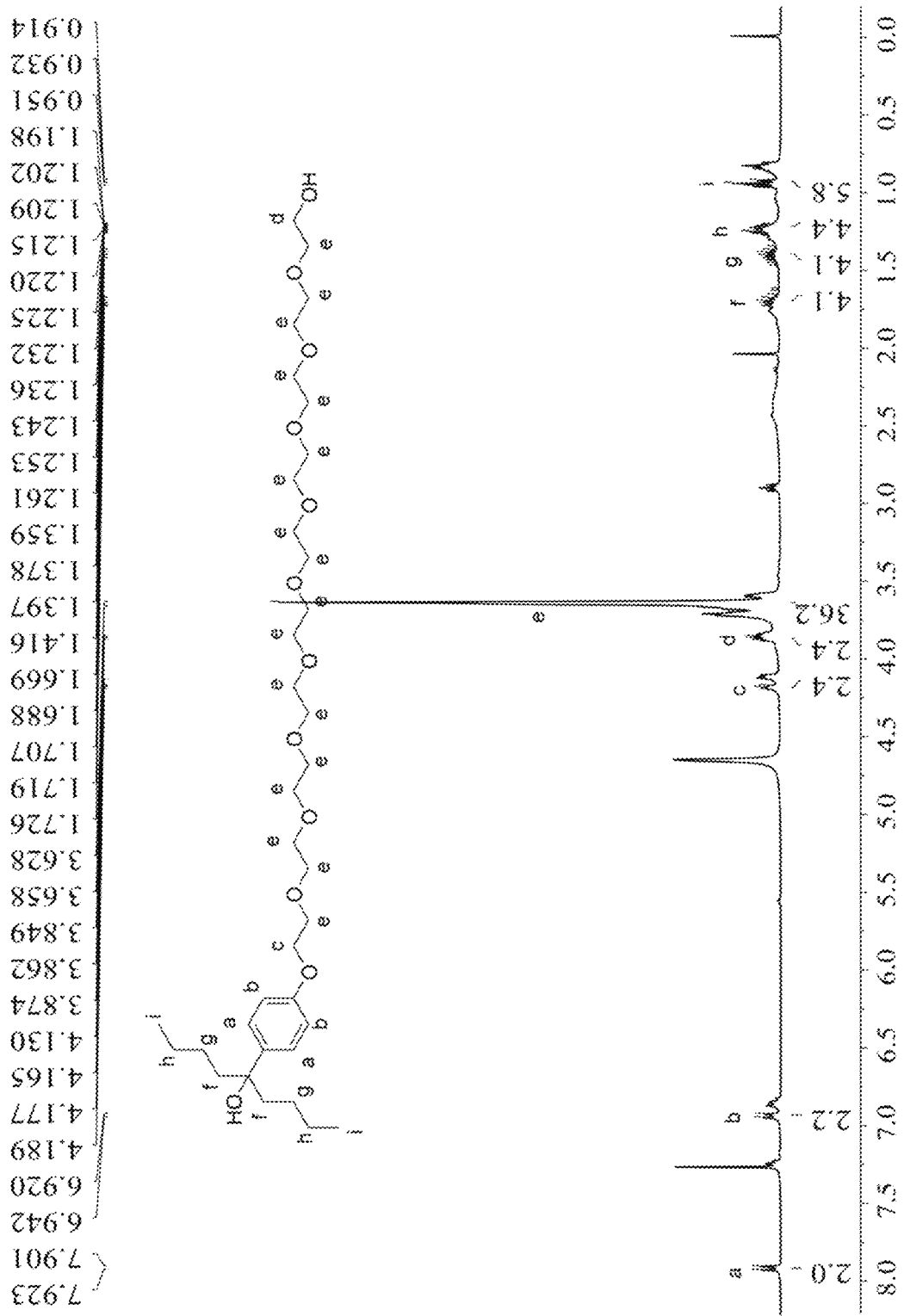
FIG. 6 shows a nuclear magnetic resonance (NMR) spectrum of the compound having the structure shown in Formula 1 provided in Example 1 of the present disclosure.

The NMR data were analyzed by MestReNova software, followed by baseline correction and phase processing. The hydrogen spectrum was integrated and peak analyzed. The results are shown in FIG. 6. The chemical shifts of protons a and b are biased to the low field, and split into peak d, with a coupling constant of 8.8 Hz. They are the spin-coupled spin protons of AA'BB' in the benzene ring, and a shielding effect of the oxygen-linked group on the adjacent position le 5 ad to the chemical shift of proton b to be smaller than that of proton a. In addition, the chemical shift of the oxygen-linked methylene of proton c is larger, and split into peak t; the chemical shift of proton d ranked second; the signal of proton e is more symmetrical and overlaps at 3.63 ppm; f, g, and h are symmetrical methylene proton signals, and coupled and split into multiple peaks, which were preliminarily assigned according to the chemical shift of the aliphatic chain; the signal of proton i was a methyl proton signal, and split into peak t. The remaining proton signals are miscellaneous peak signals, which are preliminarily speculated to be residual raw materials and the like. Based on the above information, it is basically confirmed that the alcohol ether compound having the structure shown in Formula 1 was obtained in this example.

EXAMPLE 2

4.4 g (active ingredient content) of emamectin benzoate and 4.46 g of the compound of Formula 1 prepared in Example 1 were placed in a beaker, and made up to 100 g with water. A resulting mixture was stirred at a speed of 600 r/min at room temperature for 15 min. The system gradually changed from turbid state to clear and transparent state. The clear and transparent state was maintained, thus obtaining a water-based nano-preparation for emamectin benzoate.

Figure 2:
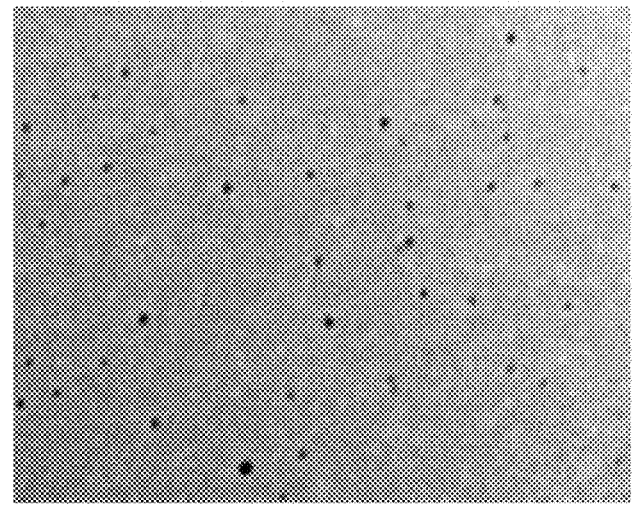
FIG. 2 shows a transmission electron microscopy (TEM) image of the water-based nano-preparation for emamectin benzoate prepared in Example 2 of the present disclosure.
Figure 3:
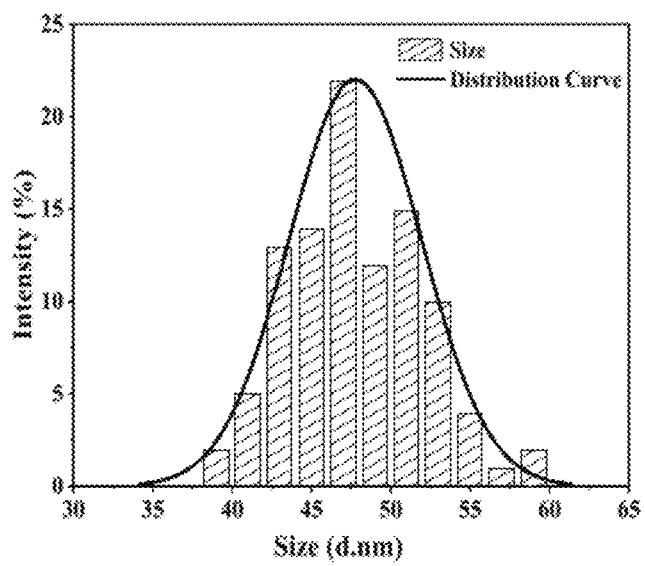
FIG. 3 shows particle size distribution of the water-based nano-preparation for emamectin benzoate prepared in Example 2 of the present disclosure.

FIG. 1 shows an SEM image of the water-based nano-preparation for emamectin benzoate prepared in Example 2 of the present disclosure. FIG. 2 shows a TEM image of the water-based nano-preparation for emamectin benzoate prepared in Example 2 of the present disclosure. FIG. 3 shows particle size distribution of the water-based nano-preparation for emamectin benzoate prepared in Example 2 of the present disclosure. The water-based nano-preparation for emamectin benzoate prepared of this example does not use any organic solvent, has a uniform spherical appearance with an average particle size of 40 nm, a drug loading capacity of 4.4%, and a dosage of the specific surfactant for synthesis being only 4.46%.

EXAMPLE 3

Preparation was conducted according to the preparation flow chart of FIG. 4:

500 g of 4'-hydroxyvalerophenone was heated to 100° C. under nitrogen, vacuum-dehydrated for 0.5 h, cooled, and sodium hydroxide accounting for 2% of a total mass of the 4'-hydroxyvalerophenone was added thereto. A resulting mixture was heated to 80° C. under nitrogen. 1.5 kg of EO was added thereto. A reaction was completed at 80° C. and 0.01 MPa, a resulting reaction product was cooled to obtain 2.0 kg of a crude product of 4-valerylphenol polyoxyethylene ether.

2.0 kg of the crude product of the 4-valerylphenol polyoxyethylene ether and 500 g of deionized water were mixed and heated to 60° C., and then stirred for 0.5 h. And 5% of activated carbon adsorbent (5% of a total mass of the crude product of 4-valerylphenol polyoxyethylene ether and the deionized water) was added thereto. A resulting mixture was stirred for another 0.5 h, and then slowly vacuumed and dehydrated for 1.5 h. A resulting system was cooled to 60° C., and filtered to obtain a pure product (1.7 kg) of the 4-valerylphenol polyoxyethylene ether having the structure shown in Formula 2.

The pure product (310 g) of the 4-valerylphenol polyoxyethylene ether having the structure shown in Formula 2 and THF (400 mL) were placed in a four-necked flask. A resulting solution was cooled to 5° C. to obtain a cooled solution, and a solution of n-butylmagnesium chloride in THF (350 mL, with a concentration of 2 M) dropwise to the cooled solution within 2 h under nitrogen protection to obtain a reaction solution. The reaction solution was heated to room temperature (25° C.) and reacted overnight. While cooling in a water bath, 10% dilute hydrochloric acid was added dropwise into the reaction solution to adjust a pH value to 5 to 6. After sufficient stirring, a product was extracted with ethyl acetate (EA) (300 mL×3), organic solutions obtained after extraction three time was combined, and then desalted and dehydrated with saturated brine, and was then subjected to desolventization to obtain a brown viscous liquid, which was the compound (300 g) having the structure shown in Formula 1.

Although the present disclosure is described in detail in conjunction with the foregoing examples, they are only a part of, not all of, the embodiments of the present disclosure. Other embodiments can be obtained based on these embodiments without creative efforts, and all of these embodiments shall fall within the scope of the present disclosure.

What is claimed is:

1. An alcohol ether compound having a structure shown in Formula 1:

Formula 1

2. A water-based nano-preparation for emamectin benzoate, comprising emamectin benzoate, a surfactant, and water, wherein the surfactant is the alcohol ether compound having the structure shown in Formula 1 of claim 1.

3. The water-based nano-preparation for emamectin benzoate of claim 2, wherein a mass percentage of the emamectin benzoate is in a range of 0.1% to 5%.

4. The water-based nano-preparation for emamectin benzoate of claim 2, wherein a mass percentage of the surfactant is in a range of 4% to 5%.

5. The water-based nano-preparation for emamectin benzoate of claim 2, wherein the water-based nano-preparation for emamectin benzoate has an average particle size of 40 nm.

* * * * *